Jan. 23, 1923.

1,442,911.

C. A. STEWARD.
TRIPPING DEVICE FOR SCOOPS OR CONVEYERS.
FILED NOV. 3, 1921.

Charles A. Steward INVENTOR.

BY Thomas G. Steward

ATTORNEY

Patented Jan. 23, 1923.

1,442,911

UNITED STATES PATENT OFFICE.

CHARLES A. STEWARD, OF PLANO, ILLINOIS.

TRIPPING DEVICE FOR SCOOPS OR CONVEYERS.

Application filed November 3, 1921. Serial No. 512,447.

*To all whom it may concern:*

Be it known that I, CHARLES A. STEWARD, a citizen of the United States, residing at Plano, in the county of Kendall and State of Illinois, have invented certain new and useful Improvements in Tripping Devices for Scoops or Conveyers, of which the following is a specification.

The invention relates to scoops for transferring increments of loose materials from places of retention to receptacles or apparatus in which they are to be stored or fashioned into useful products, and the invention has for its object the ready manipulation of the scoop whereby the dumping operation and the re-setting of the sustaining device for the forward end of the scoop may be facilitated.

Scoops of this character are of shovel-like form, and their rear ends are pivoted in a yoke, the forward ends being supported by a tripping mechanism which is released when the scoops are ready for dumping. The improvement herein revealed concerns this tripping mechanism.

The invention will be hereinafter described, reference being had to the accompanying drawing which forms a part of the specification, and in which:—

Figure 1:
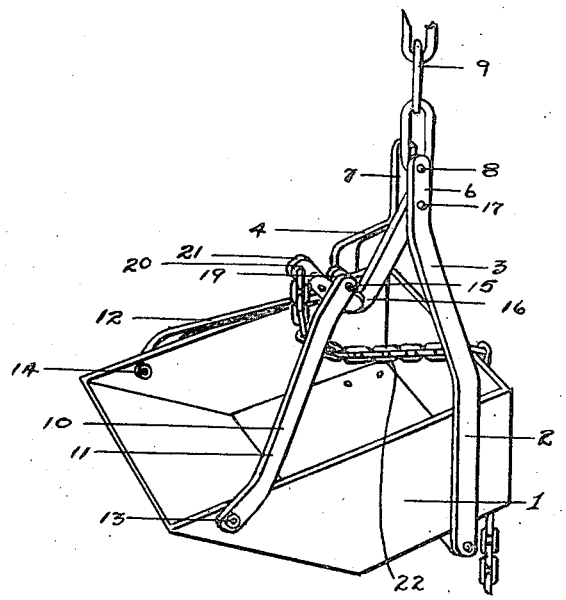
Figure 2:
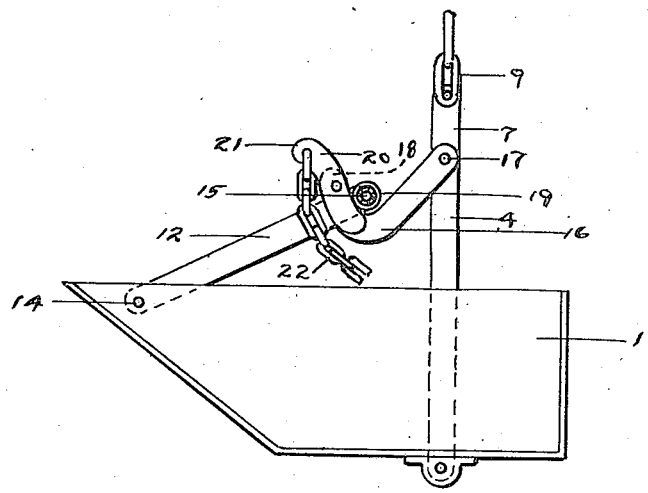

Figure 1 is a perspective view of a scoop and its associated elements in which the invention is embodied, and Figure 2 is a vertical sectional view showing some of the parts in side elevation.

The scoop 1 is of the usual shovel-like form, and is mounted at its rear end in a yoke 2 in which it is free to oscillate when its contents are to be dumped. This yoke is formed in two parts, 3 and 4, which have parallel vertical upper ends, 6 and 7, united in spaced relation by a rod or bolt, 8, extending through the final link of a chain, 9, which is attached to any suitable sustaining or controlling mechanism.

The sustaining means for the forward end of the scoop is a secondary yoke, 10, consisting of two members, 11 and 12, respectively pivoted at opposite sides of the scoop at points, 13 and 14, the upper ends of these members being united and slightly spaced by a rod or bolt, 15.

The tripping device is a hook, 16, pivoted at 17 between the vertical upper ends, 6, 7, of the yoke, 2, the free end, 18, of the hook 16 being curved to form an arc of which the point 17 is substantially the center, the object of this arcuate formation being to admit of the release of the tripping device with a minimum resistance. The ease of manipulation may be further attained by employing an anti-friction roller, 19, pivoted on the rod or bolt, 15, of the yoke, 10, and, if desired, a tripping lever, 20, pivoted on the free end of the hook, 16, may be employed to overcome the friction imposed by the load on the tripping device. Usually the tripping device will be actuated by a chain 22 or other device attached to the initial actuating element of that device. The extremity, 21, of the tripping lever is reversely curved to facilitate the re-setting of the secondary yoke 10 on the hook.

Having thus described my invention, what I claim is:

1. The combination with a scoop, of a main yoke to which said scoop is pivoted, a pivoted secondary yoke for the forward end of said scoop, and an upturned arcuate hook pivoted to said main yoke and engaging said secondary yoke the arc of said hook being substantially described from the pivot of said main yoke.

2. The combination with a scoop, of a main yoke to which said scoop is pivoted, a pivoted secondary yoke for the forward end of said scoop, an upturned arcuate hook pivoted to said main yoke and engaging said secondary yoke, and an anti-friction roller bearing on said hook the arc of said hook being substantially described from the pivot of said main yoke.

3. The combination with a scoop, of a main yoke to which said scoop is pivoted, a pivoted secondary yoke for the forward end of said scoop, an upturned arcuate hook pivoted to said main yoke and engaging said secondary yoke, and a lever for moving said hook relatively to said secondary yoke the arc of said hook being substantially described from the pivot of said main yoke.

In testimony whereof I affix my signature.

CHARLES A. STEWARD.